US012780268B2

(12) United States Patent
Jenni et al.

(10) Patent No.: US 12,780,268 B2
(45) Date of Patent: Nov. 3, 2026

(54) RAIL VEHICLE COMPRISING A POWERPACK WITH A FUEL CELL AND A FUEL TANK

(71) Applicant: STADLER RAIL AG, Bussnang (CH)

(72) Inventors: Stefan Jenni, Winterthur (CH); Marc Wagnière, Winterthur (CH); Fabian Suter, Rothenhausen (CH); Thomas Kägi, Widnau (CH); Beat Schmid, Kesswil (CH); Stefan Bernsdorf, Winterthur (CH); Markus Weber, Sevelen (CH); Robert Jones, Dornbirn (AT); Chee Wee Toh, Zürich (CH); David Williams, Bürglen (CH)

(73) Assignee: STADLER RAIL AG, Bussnang (CH)

( * ) Notice: Subject to any disclaimer, the term of this patent is extended or adjusted under 35 U.S.C. 154(b) by 560 days.

(21) Appl. No.: 18/451,991

(22) Filed: Aug. 18, 2023

(65) Prior Publication Data

US 2024/0067235 A1 Feb. 29, 2024

(30) Foreign Application Priority Data

Aug. 23, 2022 (EP) .................................... 22191601

(51) Int. Cl.
*B61C 3/00* (2006.01)
*B61C 17/06* (2006.01)
(Continued)

(52) U.S. Cl.
CPC ................ *B61C 3/00* (2013.01); *B61C 17/06* (2013.01); *H01M 8/04201* (2013.01);
(Continued)

(58) Field of Classification Search
CPC .......... B60L 50/00; B60L 50/50; B60L 50/70; B60L 50/71; B60L 50/72; B60L 50/75;
(Continued)

(56) References Cited

U.S. PATENT DOCUMENTS 9,751,540 B2 9/2017 Cook
2006/0196475 A1* 9/2006 Tomoda .............. F02M 59/102 123/456
(Continued)

FOREIGN PATENT DOCUMENTS

DE 93 06 483 U1 9/1993
DE 9306486 U1 * 9/1993
(Continued)

OTHER PUBLICATIONS

European Search Report Corresponding to 22191601.8 mailed Feb. 6, 2023.

*Primary Examiner* — S. Joseph Morano
*Assistant Examiner* — Heaven R Buffington
(74) *Attorney, Agent, or Firm* — Secant IP, P.L.L.C.

(57) ABSTRACT

The invention relates to a rail vehicle (1) comprising a first passenger car and a powerpack (2) having a longitudinal axis, the powerpack (2) and the passenger car being coupled together. The powerpack (2) comprises at least one fuel cell (20) and at least one fuel tank (21) having a fuel tank valve (33). The powerpack (2) is mounted on at least one bogie. The rail vehicle (1) comprises at least one driven bogie which can be supplied with electrical energy from the fuel cell (20).

18 Claims, 8 Drawing Sheets

Figure 1:
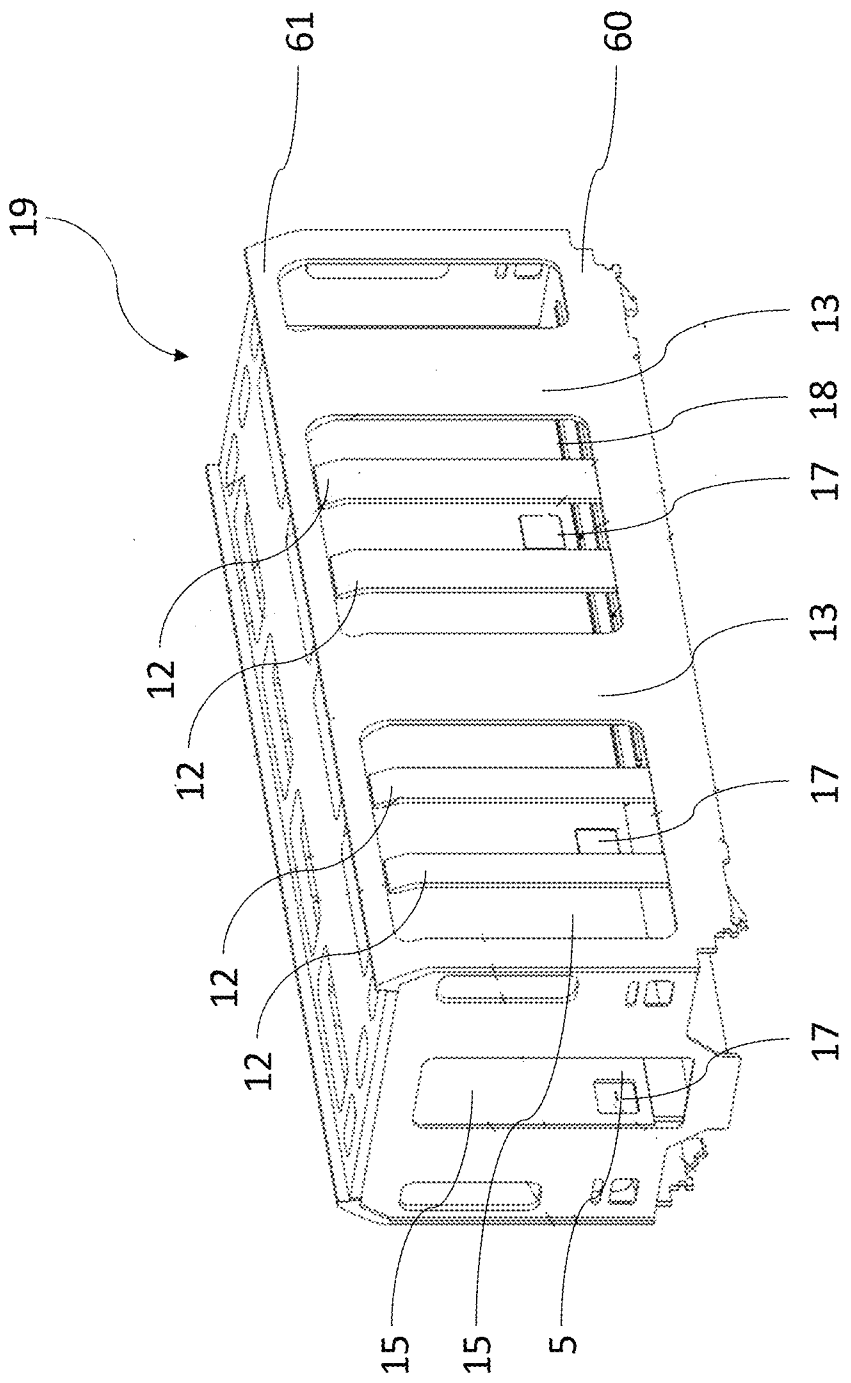

(51) Int. Cl.

| | |
|---|---|
| ***H01M 8/04082*** | (2016.01) |
| ***H01M 8/04313*** | (2016.01) |
| ***H01M 8/04746*** | (2016.01) |

(52) U.S. Cl.
CPC ... *H01M 8/04313* (2013.01); *H01M 8/04753* (2013.01); *H01M 2250/20* (2013.01)

(58) Field of Classification Search
CPC ........ B60L 58/30; B60L 2200/26; B60P 3/22; B60P 3/2205; B60P 3/2215; B60P 3/225; B60P 3/2255; B60P 3/2296; B60P 3/2285; B60P 3/24; B61C 3/00; B61C 17/02; B61C 17/04; B61C 17/06; B61D 5/06; B61D 5/08; B61D 27/009; B61D 45/008; H01M 8/04201; H01M 8/04313; H01M 8/04753; H01M 2250/20
USPC .......................................... 105/34.4, 49, 34.1
See application file for complete search history.

(56) References Cited

U.S. PATENT DOCUMENTS

| | | | | |
|---|---|---|---|---|
| 2015/0367736 | A1 | 12/2015 | Salomonsen | |
| 2016/0039281 | A1 * | 2/2016 | Shipp .................. | B60K 15/067 280/834 |
| 2023/0202347 | A1 * | 6/2023 | Lavertu .................. | B60L 15/38 701/22 |
| 2024/0043047 | A1 * | 2/2024 | Wilhelm ................ | B61C 17/02 |

FOREIGN PATENT DOCUMENTS

| | | | | |
|---|---|---|---|---|
| DE | 10 2020 107 337 | A1 | 9/2021 | |
| EP | 3 078 561 | A1 | 10/2016 | |
| EP | 3944980 | A1 | 2/2022 | |
| WO | WO-2017091579 | A1 * | 6/2017 | ............. B61C 17/04 |
| WO | WO2020016152 | A1 | 1/2020 | |
| WO | WO-2020016205 | A1 * | 1/2020 | ............... B61C 5/00 |
| WO | 2022/036069 | A1 | 2/2022 | |
| WO | 2022/135810 | A1 | 6/2022 | |

* cited by examiner

RAIL VEHICLE COMPRISING A POWERPACK WITH A FUEL CELL AND A FUEL TANK

The present invention relates to a rail vehicle comprising a powerpack with a fuel cell and a fuel tank.

Rail vehicles with a fuel cell drive are known per se. EP 3 078 561, for example, discloses a rail vehicle with a fuel cell drive. The fuel required for operation is contained in tanks distributed throughout the rail vehicle. This means that long fuel lines and fuel-carrying transitions between individual cars of the rail vehicle are required. As a result, the transitions, which are located at the car transitions that are flexible, are expensive to construct and maintain. In addition, the fuel-carrying transitions pose a safety risk. The fuel in the pipes has a high pressure. In the event of an accident, the fuel-carrying transitions can leak and the highly flammable fuel, which is under high pressure, escapes. People can be injured by the fuel escaping at high pressure or high velocity. In addition, it is possible that the escaping fuel ignites and thus injures people.

Fuel tanks arranged on the roof of a rail vehicle are also known. Only a certain amount of weight can be placed on the roof of a rail vehicle for constructive reasons and driving dynamics. In addition, the space on the roof of a rail vehicle is significantly restricted because the overhead line is mounted at a certain height and as much space as possible should be available for passengers or goods between the upper edge of the rail and the overhead line. As a result, the amount of fuel that can be carried on the roof of a rail vehicle is limited. Even if fuel tanks are placed on the roof of the rail vehicle, the space on the roof is not available for other equipment. It is not possible, or at least extremely disadvantageous and constructively complex, to install fuel tanks and a pantograph on the roof of a bimodal rail vehicle. In addition, a rail vehicle with fuel tanks on the roof has unfavourable collision behaviour.

It is the object of the invention to overcome the disadvantages of the prior art and in particular to create a rail vehicle with fuel cell propulsion, which has a high level of safety and at the same time a simplified design.

The object is solved by a rail vehicle according to the independent claim.

In particular, the object is solved by a rail vehicle comprising a first passenger car and a powerpack having a longitudinal axis, the powerpack and the passenger car being coupled to each other. The powerpack has at least one fuel cell and at least one fuel tank with a fuel tank valve. The powerpack is mounted on at least one bogie. In particular, the powerpack does not comprise passenger seats. The rail vehicle comprises at least one driven bogie, which can be supplied with electrical energy from the fuel cells.

Such a rail vehicle with a powerpack exhibits particularly favourable crash behaviour in the event of a collision. In particular if the rail vehicle rolls over or rolls around its longitudinal axis after a collision (roll-over crash scenario), the arrangement of the fuel cells and the fuel tank in a powerpack is advantageous. In addition, safety is increased because only very short fuel lines are required, and no fuel lines are necessary at the car transitions. Of course, there may be electrical lines at the wagon transitions. In addition, the power and range of such a rail vehicle can be easily scaled. Thus, more fuel cells and/or more fuel tanks can be arranged in the powerpack if required.

The connection between the fuel tanks and the fuel cells can be made short by arranging both the fuel tanks and the fuel cells in the powerpack.

The powerpack accommodates both the fuel tanks and the fuel cells, including auxiliary power units. This means that there are no fuel tanks as well as fuel cells on the other train parts (cars). The other parts of the train can therefore be designed essentially as for a conventional train. For the operation of a rail vehicle with a fuel cell, only the power pack has to be replaced, modified or supplemented.

The rail vehicle comprises at least one passenger car. Passenger car means that the passenger car is intended to accommodate passengers and is equipped with the corresponding facilities such as seats, toilets and/or doors. The powerpack is not designed to accommodate passengers. However, the powerpack may be configured to allow passengers to move through the powerpack from a car in front of the powerpack to a car behind the powerpack. It is, of course, possible for passengers to also stand, walk, or stay in the area of the powerpack, such as in a central aisle. However, the powerpack is not intended for the permanent stay of passengers. This means that no devices are provided in the powerpack for the permanent stay of passengers (e.g. seats).

The rail vehicle may have one or more passenger cars. The passenger cars may be end cars or middle cars. The rail vehicle may be driven by the first and/or last car (end cars) of the rail vehicle. Driven cars are equipped with traction equipment, which in particular comprises the usual components of the traction chain such as drive motor, power converter and the like. In this case, the drive is preferably effected at least via the first and/or the last bogie of the vehicle. It is also possible that the drive takes place via several bogies, which do not have to be end bogies. The driven cars may be equipped with traction batteries and auxiliary drives. The traction batteries or auxiliary drives can be located on the roof or underfloor. It is possible that the traction equipment is located in the end cars or distributed. The traction batteries and auxiliary drives can be supplied with energy via the fuel cells.

It is possible that the rail vehicle comprises multiple powerpacks. One or more powerpacks can thus be combined with a plurality of passenger cars.

It is possible for the rail vehicle to include one powerpack and two powered end cars, as well as additional middle cars. The middle cars may or may not be powered. The middle cars may be equipped with technical equipment, for example batteries.

The rail vehicle may be designed such that the power pack comprises at least one machine compartment for the fuel cells and at least one tank compartment for the fuel tank. The machine compartment may comprise at least two fuel cells. The fuel cells may be arranged one above the other. The tank compartment may comprise storage modules with at least two fuel tanks. In particular, the fuel tanks may each be positioned vertically upright.

By arranging the fuel tanks in a tank compartment and the fuel cells in a machine compartment, the fuel tanks and the fuel cells can be structurally separated from the passenger area. This ensures that no fuel can pervade to the passengers. In addition, the tank compartment and the machine compartment can thus be acoustically isolated or damped, which ensures a high level of passenger comfort.

It is possible for the machine compartment to be arranged next to the tank compartment. This arrangement means that only very short fuel lines are required. Due to the short fuel lines, this design is extremely simple and defects can be avoided. Access to the machine compartments for maintenance purposes can be provided by maintenance hatches arranged on one or both sides of the rail vehicle. The maintenance hatches can be arranged in the outer wall of the rail vehicle. The maintenance hatches can essentially occupy a large part of the lateral surface of the powerpack. This is possible because the structural stability of the passenger compartment is essentially provided by the inner wall between the passenger compartment (aisle) and the machine compartment or by the wall between the passenger compartment (aisle) and the tank compartment. It is possible that the wall between the machine compartment and the passenger compartment (aisle) and/or the wall between the tank compartment and the passenger compartment (aisle) also comprises maintenance hatches.

The powerpacks are designed such that the number of fuel cells is adjustable and the number of fuel tanks is adjustable.

Preferably, eight fuel cells may be installed in the powerpacks. Four fuel cells can be provided per machine compartment, so that eight fuel cells are arranged in a powerpack that has two machine compartments. It is possible to arrange one, two, three, four or another number of fuel cells in a powerpack. Thus, depending on the energy requirements of the rail vehicle, more or fewer fuel cells can be arranged in the powerpack. It is possible to install more fuel cells in a powerpack of a rail vehicle that is long and heavy and/or requires high power due to the track layout (gradient). A powerpack of a rail vehicle that requires less power (few scales, little weight, few inclines in the route) can be assigned fewer fuel cells.

It is therefore possible to adapt the number of fuel cells to the required power of the rail vehicle independently of the number of fuel tanks, since the number of fuel cells can be changed without affecting the installation space for the fuel tanks.

The number of fuel tanks can also be varied as required. For example, if the rail vehicle commutes on a short route and can be refuelled often, a powerpack with a low storage capacity (few fuel tanks) adapted to the route can be installed in the rail vehicle's train composition. If a rail vehicle is to cover longer distances between refuelling operations, a powerpack with a high storage capacity (many fuel tanks) adapted to the route can be installed in the rail vehicle. The powerpacks can thus be manufactured in different sizes or lengths with different, adaptable fuel capacities (number of fuel tanks) as required. Due to the modular design, this can be done easily and quickly. It is possible for a powerpack to have 56 fuel tanks. Then eight storage modules, each with 7 fuel tanks, are arranged in the powerpack. Then four storage modules are arranged on each rail vehicle side.

The number of fuel tanks in a powerpack and the number of fuel cells in a powerpack can thus be varied essentially independently of one another. It is thus possible to assign an advantageous ratio of power (number of fuel cells) and fuel capacity (number of fuel tanks) individually and modularly for each rail vehicle, depending on its use.

A powerpack can thus be adapted according to the use of the rail vehicle.

The rail vehicle can be a regional train.

The fuel cells can be installed vertically one above the other in the machine compartment of the powerpack. Auxiliaries may be associated with each fuel cell. Auxiliaries can be, for example, an air filter or a 750 high-voltage interface. It is also possible that auxiliaries are formed for multiple fuel cells. It is possible that auxiliaries are provided for all fuel cells of a machine compartment. Then, an arrangement of auxiliary power packs is associated with a machine compartment.

The powerpack can comprise a first power supply system with at least one fuel cell and one fuel tank and a second power supply system with one fuel cell and one fuel tank. The two power supply systems can be designed to be operable independently of each other.

By arranging at least one fuel cell and at least one fuel tank in one power supply system, each power supply system can be operated independently of another power supply system. By having two power supply systems that are independent of each other, it is possible to operate a rail vehicle even if one of the power supply systems fails.

Possibly, the power of the rail vehicle is then reduced. However, the rail vehicle can reach the next station under its own power to allow passengers to disembark there.

It is possible that the first power supply system and/or the second power supply system comprises multiple fuel cells and multiple fuel tanks. The first power supply system and the second power supply system may be identical or different. This means that the first power supply system and the second power supply system may have the same number of fuel cells and/or fuel tanks, or that the first power supply system and the second power supply system may have a different number of fuel cells and/or fuel tanks.

The powerpack may include an aisle. The powerpack may also include a central aisle. The central aisle may be accessible to passengers. The central aisle may be designed substantially gas impermeable from the machine compartment and/or the fuel tank compartment. It is possible to have one machine compartment and one tank compartment on each side of the aisle. In this case, one power supply system is provided for each rail vehicle side.

Essentially impermeable to gas means that gas cannot enter the passenger compartment in large quantities or only slowly. If fuel enters the passenger compartment, it does so only in very small, insignificant quantities. Such small quantities evaporate quickly and essentially pose no danger to passengers. This ensures that no fuel in liquid or gaseous form can get into the passenger area. The separation of the passenger compartment from the machine compartment and the tank compartment thus ensures a high level of safety for passengers.

The arrangement of one power supply system per rail vehicle side results in an advantageous weight distribution.

The rail vehicle can have a refuelling device. The refuelling device may be connected to the fuel tank. The refuelling device may have a right refuelling nozzle accessible from the right side of the longitudinal axis of the powerpack. The refuelling device may simultaneously include a left refuelling nozzle accessible from the left side of the longitudinal axis of the power pack.

Through the refuelling device, the rail vehicle can be refuelled. The presence of a right refuelling nozzle and a left refuelling nozzle makes it possible to refuel the rail vehicle from both sides. This is particularly advantageous because in a rail network, depending on the direction of travel of the rail vehicle, the refuelling station can be located on the right or left side of the rail vehicle. By arranging the refuelling nozzles on both sides, the rail vehicle can be refuelled from the right side as well as from the left side, and time-consuming turning of the rail vehicle is avoided.

It is possible for several refuelling nozzles to be installed on each rail vehicle side or in each tank compartment. The presence of several refuelling nozzles, even on the same rail vehicle side, makes it possible to shorten the refuelling time. It is possible for refuelling to take place at a pressure of essentially 350 bar. Then the rail vehicle can be refuelled from both sides at the same time. It is possible that the rail vehicle is refuelled on each side by means of several refuelling nozzles. Such an approach can significantly shorten the refuelling time.

It is possible for the rail vehicle to have one refuelling device per power supply system.

This allows the rail vehicle to be refuelled advantageously and quickly.

It is possible that the first power supply system of the rail vehicle comprises a first controller and that the second power supply system of the rail vehicle comprises a second controller.

Due to the redundancy of the controllers, it is possible to operate the energy supply systems independently of each other. Due to the redundancy of the controllers, the rail vehicle can thus still continue on its way and reach the next station or a workshop if one of the power supply systems fails.

It is possible for the powerpack to include multiple overpressure components, each of which interacts with the controller. It is possible that the powerpack comprises a pressure sensor that detects a certain overpressure (e.g. greater than 12 bar) in a line, sends a corresponding signal to the controller, which then sends a signal to close a valve associated with the line. The pressure sensor is arranged in a line at a location which, during operation of the power supply system, is downstream of a pressure reducer associated with a fuel tank. It is thus possible for the fuel tanks to have higher pressures without the sensor in the line detecting this.

It is also possible for the rail vehicle to have a pressure relief valve. The overpressure valve can be designed to open at a certain overpressure (e.g. greater than 14 bar) in a line and to discharge the excess fuel through the roof of the rail vehicle. The pressure relief valve is also located downstream of a pressure reducer associated with a fuel tank when the energy supply system is in operation. It is thus possible for the fuel tanks to have higher pressures without the pressure relief valve tripping. Thus, there can be several stages in the overpressure protection. In the first stage, a relevant valve is first closed so that no further fuel can enter the line with the detected overpressure. If the pressure in the line continues to rise, the pressure is released via a pressure relief valve in the second stage.

Thus, in the first stage, an attempt is made to reregulate the pressure without emitting fuel to the environment. If this does not lead to the desired success, the pressure can be released in a second stage. This makes it extremely unlikely that pipes or other components will burst due to overpressure. Furthermore, the multi-stage process of the device ensures that it is equally unlikely that fuel will be emitted to the environment to regulate the pressure. Overall, this results in a device in which it is extremely unlikely that lines or other components will burst due to overpressure or that fuel will have to be emitted into the environment. This ensures a high level of safety for both passengers and the environment.

It is possible that the fuel tank is designed to be displaceable in the event of an overload. It is also possible that a fuel tank frame is designed to be displaceable in the event of an overload.

Overload means mechanical loads that are significantly higher than the usual mechanical loads during normal operation. It is also possible that the fuel tanks are only displaceable in the event of an overload, which occurs during particularly severe collisions. In this case, the fuel tanks are designed so that they cannot be displaced in the event of light collisions.

In the event of a crash, at least part of the energy generated is thus absorbed by displacement of the fuel tanks or by deformation of the fuel tank frame. Due to the displaceability of the fuel tanks or the displaceability of the fuel tank framework, the fuel tanks only have to absorb a fraction of the energy that they would have to absorb without displaceability. Thus, the forces exerted on the fuel tank in the event of a crash are minimized. This ensures that the fuel tanks only have to absorb a minimum of crash energy. Thus, it is extremely unlikely that the fuel tanks will be deformed or ruptured by external mechanical impact.

It is possible that after displacement, the fuel tanks will rest against each other and support each other by positive locking.

It is possible that at least two fuel tanks are mounted on a storage module, the storage module allowing simultaneous installation and removal of the fuel tanks mounted thereon. The storage module can be slidably mounted in the powerpack for installation and removal. In its installation position, the storage module can be detachably fastened in the powerpack.

This makes it possible to equip the rail vehicle with storage modules as required. By combining fuel tanks into one storage module, several fuel tanks can be installed or removed at the same time. This makes installation or removal simple and efficient.

Preferably, a storage module has an odd number of fuel tanks. Then the essentially cylindrical fuel tanks of a storage module can be arranged alternately and thus save space.

By storage modules are bundles. Thus, for example, a storage module with seven fuel tanks is a bundle of seven fuel tanks.

A storage module comprises a predetermined number of fuel tanks. The fuel tanks of a storage module may be fixed at the top and bottom of the holding device of the storage module. The connection of the storage module is for connection to an on-board fuel routing system. The fuel routing system essentially connects the fuel tanks to the fuel cells.

The storage modules can be designed such that each storage module can be mounted in a location intended for mounting. This ensures high and rapid interchangeability and good repairability and maintainability. The fuel tank frame of the storage module may comprise a welded frame, for example made of S355 steel, and two reinforcing elements in the upper part to protect the tank valves. Furthermore, the storage module may comprise a cable harness that groups together various power or signal cables, preferably with at least one power cable and one signal cable running to each fuel tank.

The storage module may also comprise a fuel main connecting the tanks. Each storage module may be attached to the rail vehicle at its top and bottom with dampers, preferably metal dampers.

This design with storage modules makes it easy to adapt the range of the rail vehicle to the operator's requirements by adding additional storage modules in a modular way. It is thus possible for the length of the power-pack to vary depending on where the rail vehicle is used. This means that a short powerpack or a long powerpack can be integrated into the rail vehicle, depending on how it is used. The length of a powerpack remains essentially unchanged after it has been manufactured.

A rail vehicle used on a route with long distances from the refuelling station or steep gradients can thus be equipped with more storage modules. A rail vehicle that is used on a flat route where little fuel is required or on a route where there are many refuelling stations can be equipped with few storage modules. By arranging more or fewer storage modules, the installation space for the fuel cells is essentially not affected. This ensures that the number of storage modules in the powerpack can be simply and easily expanded or reduced. Thus, by adjusting the number of storage modules in the powerpack, the train can be adapted to the prevailing conditions simply and efficiently and without any significant impact on the other components of the rail vehicle.

It is thus possible to vary the available space for fuel tanks as needed. Preferably, the length of the powerpack can be varied in steps corresponding to the length of a storage module. Thus, it may be possible to add only complete storage modules to a powerpack at a time. There can thus be powerpack lengths for, for example, one, two, three, four, five, six, seven or eight or more storage modules. The power pack lengths can thus be adapted to a whole number of storage modules. For good use of the installation space, the storage modules are evenly distributed between the tank compartments on the two rail vehicle sides. Particularly good use is made of the available space if the tank compartment on the right-hand side of the rail vehicle and the tank compartment on the left-hand side of the rail vehicle each contain the same number of storage modules. The length of the powerpack can then be varied in steps, each corresponding to an even number of storage modules.

The storage modules can be moved in the rail vehicle by means of mounting slides. The guide rails for this can be permanently installed in the rail vehicle. During installation, one complete storage module at a time can be placed on the mounting slide. The mounting carriage is moved to the installation position of the storage module. Finally, the memory module is set down and the mounting slide is removed again. The storage module positioned exactly in this way is then screwed into place and connected to the necessary supply lines. The necessary supply lines are in particular a fuel line, a fuel relief line, a power line and a control line for sensors. It is possible that all power and controller lines are combined in one line bundle or connector.

The fuel tanks may be connected to each other via a fuel main line. The fuel tanks can be installed vertically. Vertical installation means that the longitudinal axis of the fuel tanks is substantially vertical when the rail vehicle is aligned horizontally on a horizontally arranged rail.

The fuel tanks can be filled and emptied via a fuel distribution system.

A cooling system for the fuel cells can be formed on the roof of the powerpack. This means that main components of the cooling system are located on the roof of the powerpack. It is possible that the cooling system is formed in several areas of the powerpack.

The powerpack can have two types of cooling circuits. One cooling circuit may be a HT (high temperature) cooling circuit. Another cooling circuit may be an LT (Low Temperature) cooling circuit. Each fuel cell can have an associated HT cooling circuit. Several fuel cells of a machine compartment can be assigned an LT cooling circuit. A powerpack with two machine compartments then has two LT cooling circuits and a large number of HT cooling circuits. The number of HT cooling circuits corresponds to the number of fuel cells in the powerpack.

A heat exchanger, a temperature sensor, a fuel sensor, a fan with a fan motor, and an expansion vessel with a level sensor may be associated with a HT cooling circuit. It is possible that the fuel cell has a water pump. The cooling air can be drawn in through a ventilation grille on the side of the roof area of the powerpack. In addition, the cooling air can be drawn in through the machine compartment at side ventilation grilles.

The LT cooling circuit cools electrical components of the powerpack. For example, the LT cooling circuit cools a compressor as well as a compressor control unit in the powerpack. Thus, the LT cooling circuit can cool other components of the powerpack in addition to the fuel cells. The LT cooling system may be located substantially at the bottom of the powerpack. Air for the LT cooling system may be drawn in from the side and discharged from the top center of the vehicle or the bottom center of the vehicle. The LT cooling system may be separated from the fuel area. The HT cooling system can be explosion-proof. It is also possible for both cooling systems, i.e. both the HT cooling system and the LT cooling system, to be explosion-proof.

The fuel tanks can be accommodated in the tank compartments on the side of the powerpack. The fuel tanks may be designed as carbon fiber fuel tanks. It is possible that the fuel tanks each carry 6-7 kg, in particular about 6 kg of fuel at a nominal pressure of 350 bar.

It is possible that the fuel tanks are equipped with a thermal pressure relief device. Such a pressure relief device releases pressure from the fuel tank when a certain temperature is exceeded. The release temperature of the pressure relief device is well below the burst temperature of the fuel tank. Thus, it is essentially impossible for the burst temperature to be effectively reached in a fuel tank equipped with a pressure relief device. Thus, even if the pressure in the fuel tanks is increased, for example by heating the fuel tanks during a fire, bursting of the fuel tanks can be largely eliminated. It is possible for the pressure relief devices of several fuel tanks, for example the fuel tanks of a storage module, to be connected to a line leading to the roof of the rail vehicle. Then, in the event of overpressure, the fuel can escape via the roof. This minimizes the likelihood that passers-by will be endangered if the overpressure escapes.

The tank compartment can be separated from the passenger compartment by means of a welded-in wall. The welded-in wall can have a circumferential weld seam. During operation, the tank compartment is permanently ventilated. The air inlets can be located in the lower part of the outer wall. The ventilators can be located in the roof area. The fans can also be used to cool the fuel cells. In this case, the fans ventilate both the machine compartment and the tank compartment.

The area of the powerpack where fuel is located (e.g. the machine compartment and the tank compartment) can be designed in such a way that no fuel residues remain even in the event of a failure of the forced ventilation or in the park position or on standby in the event of a fuel leak. Rather, the fuel can escape upwards by itself. It is also possible for the fuel to escape through the bottom of the powerpack. This ensures that even in the event of a rollover, i.e. if the car body comes to rest on the roof in the event of an accident, the fuel can escape upward through the floor of the sliding vehicle against the force of gravity. This ensures that the fuel can escape even if the rail vehicle is upside down, without the need for active technical equipment.

To ensure that the fuel tanks are leak-proof, a pressure switch can be used to ensure that the pressure in the fuel tanks does not drop below 15 bar. It is thus possible for the pressure in the fuel tanks to be monitored and for the pressure switch to close the fuel tank valve as soon as 15 bar or less is present in one or more fuel tanks. The pressure switch is located upstream of a pressure reducer associated with a fuel tank when the power supply device is in operation. Thus, a lower pressure can be formed downstream in the fuel lines without the pressure switch tripping.

It is possible that the powerpack has fuel sensors, for example hydrogen sensors. It is possible that one or more fuel sensors are provided per power supply system. This allows leakage to be detected. It is possible that the fuel sensors detect a 3-percent fuel concentration and that the controller then closes the feed valves at the affected point of the powerpack. It is also possible that fuel sensors are located in the fuel cells. This means that leaks can also be detected in the fuel cells. It is possible that the system is designed in such a way that from a detection of a 2-percent fuel concentration, the corresponding fuel cell is shut down in an orderly and controlled manner. It is also possible that from a detection of a 3-percent fuel concentration, the fuel cell is switched off immediately and quickly in an emergency. It is also possible that the rail vehicle has further fuel sensors.

It is possible that at least two storage modules, in particular two storage modules per tank compartment, are formed.

This allows the rail vehicle to be operated for a long time and with a high performance.

Preferably, the storage modules are arranged as evenly as possible on the tank compartments in the different rail vehicle sides. This results in an advantageous weight distribution and efficient use of space.

It is possible for the fuel tanks of a storage module to be spaced apart from one another and thus not to touch during normal operation.

This ensures that the tanks can expand when the temperature rises or when the fuel tanks are refuelled. This makes it extremely unlikely that external constraints and stresses will occur in the fuel tanks.

The fuel tank valves are designed to absorb the forces that occur during a crash. These can essentially be shear forces. It is also possible that the fuel tank structure of the fuel tanks is designed to yield at a certain force. In the event of a crash, it is then possible, as described above, for the fuel tanks to shift. It is also possible that the fuel tanks are only designed to shift in the event of a particularly severe crash. By displacing the fuel tanks, the forces acting on the fuel tanks are thus limited. In particular, this prevents the fuel tank valves from rupturing and fuel from escaping at a high pressure. It is possible for a fuel tank to be arranged to slip approximately 10 cm transversely to the direction of travel. It is possible that the fuel tank is supported by other tanks or by other components by means of a positive fit after slipping by about 5-8 cm. It is also possible that the innermost row of tanks is supported by the aisle wall approx. 2-5 cm after shifting transverse to the direction of travel. It is possible that the reinforcing elements can allow a displacement of the fuel tanks in the direction of the reinforcing elements of about 4-6 cm and then support the fuel tanks.

It is possible that the rail vehicle comprises a second passenger car coupled to the powerpack and, in particular, the first and second passenger cars are each connected to the powerpack via Jacob's bogies.

The cars connected to the powerpack with a Jacob's bogie may be middle cars or end cars.

It is also possible for the rail vehicle to include bogies other than Jakobs bogies. It is possible for the rail vehicle to include Jacob's bogies as well as conventional bogies.

The Jacob's bogies of the powerpack may have a pivot distance of 7200 mm, 9000 mm, and 10800 mm, respectively.

It is possible that one fuel cell at a time is supported on an extendable platform in a holding device. It is possible that the holding device is mounted on dampers.

The extendable arrangement of the fuel cells makes it simple and straightforward to replace or maintain the fuel cells. This means that when the fuel cells are replaced or serviced, no major conversion work needs to be carried out.

It is possible that the fuel cells are mounted on the extendable platform and the extendable platform is mounted on the holding devices by means of telescopic extension. The fuel cells may be mounted on the extendable platforms by means of screws or other removable fasteners. The dampers may be metal dampers. The dampers may be made of steel or other metal alloy.

It is possible for each fuel tank to be secured by a fixed lager and a loose bearing.

Such a mounting ensures that the fuel tank is securely fastened and yet can expand when heated or refuelled. This ensures that the fuel tanks will not be stressed by any significant external forces or constraints, even during expansion or contraction.

On the underside, the fuel tanks can be connected to the storage modules by the fixed bearing. On the upper side the fuel tanks can be fixed by means of the loose bearing. Loose bearing means that the fuel tanks are mounted movably in vertical direction.

It is possible that reinforcing elements are arranged in an outer side of the machine compartment and/or the tank compartment, connecting an upper part of the car body and a lower part of the car body.

This protects the tank compartment from external mechanical impact.

It is possible for the reinforcing elements to be fixed in the lower part of the car body and floating in the upper part.

The structure of the powerpack can be designed to meet the load cases required by the standards. The reinforcing elements protect the interior of the rail vehicle. In the event of a crash, the reinforcing elements distribute the energy substantially evenly over several storage modules. This ensures that one storage module does not have to absorb a large proportion of the crash energy. Rather, one storage module at a time is subjected to as little crash energy as possible. The reinforcing elements can be made of S355 steel profiles and sheets. The steel profiles and sheets can have the same depth as the vehicle body structure. This means that the car body and reinforcing elements are substantially flush on the outer side of the rail vehicle, resulting in a substantially flat surface.

It is possible that the outer wall of the car body has a thickness of about 5 cm. It is possible that the reinforcing elements have a thickness of about 5 cm. The thickness is the extension of the components transverse to the direction of travel.

The reinforcing elements may be connected to the car body at the bottom and at the top. In the lower area, the reinforcing elements can be connected to the car body by a fixed bearing. This means that the reinforcing elements are mounted in such a way that forces in any direction and torques can be absorbed in the area of the bearing. In the lower area, the reinforcing elements can have a positive connection with the lower connection, for example by means of a screw connection.

In the upper area, the reinforcing elements can be connected to the car body by a floating bearing. The floating bearing ensures that the reinforcing elements are not subjected to external forces in the event of thermal expansion or twisting of the car body. This means that deformation or twisting of the car body can take place without the reinforcing elements being stressed by external constraints.

Bearing by means of a floating bearing means that the reinforcing elements are mounted so that they float in the upper area. Floating means that the reinforcing elements cannot absorb any forces in one direction.

The reinforcing elements are arranged in such a way that an obstacle with a length of 2.4 m and a height of 152 mm is supported by at least two reinforcing elements or car body columns. The distance between two reinforcing elements is therefore preferably a maximum of 1 m.

The fuel tanks and the refuelling device can be protected by further safety measures.

The refuelling nozzle may be protected by a frame. The refuelling fixture can be designed to be particularly stable.

The individual fuel tanks may be designed to withstand a pressure that is significantly higher than the operating pressure of the fuel tanks.

It is possible that the powerpack includes acceleration sensors and a valve control system. It is possible that the power-pack comprises acceleration sensors and valve control systems for each power supply system. The valve control system can be designed in such a way that all fuel tank valves of the power supply system, in particular all fuel tank valves, can be closed if the permissible acceleration is exceeded.

This ensures that no major fuel leaks occur in the event of a crash.

It is possible that in the event of a collision, the acceleration sensors in the powerpack will detect the crash. If a certain impact force was exceeded in the crash, it is possible that all fuel supply valves can be closed. This ensures that even in the event of an accident or collision, as little fuel as possible escapes. This also ensures a high level of safety.

It is possible for the tank compartment to have ventilation openings. It is also possible for the tank compartment to have an active ventilation device.

This ensures that when small amounts of fuel escape, the fuel is directed into the environment of the sliding vehicle, thus preventing larger fuel accumulations in the tank compartment.

Figure 2:
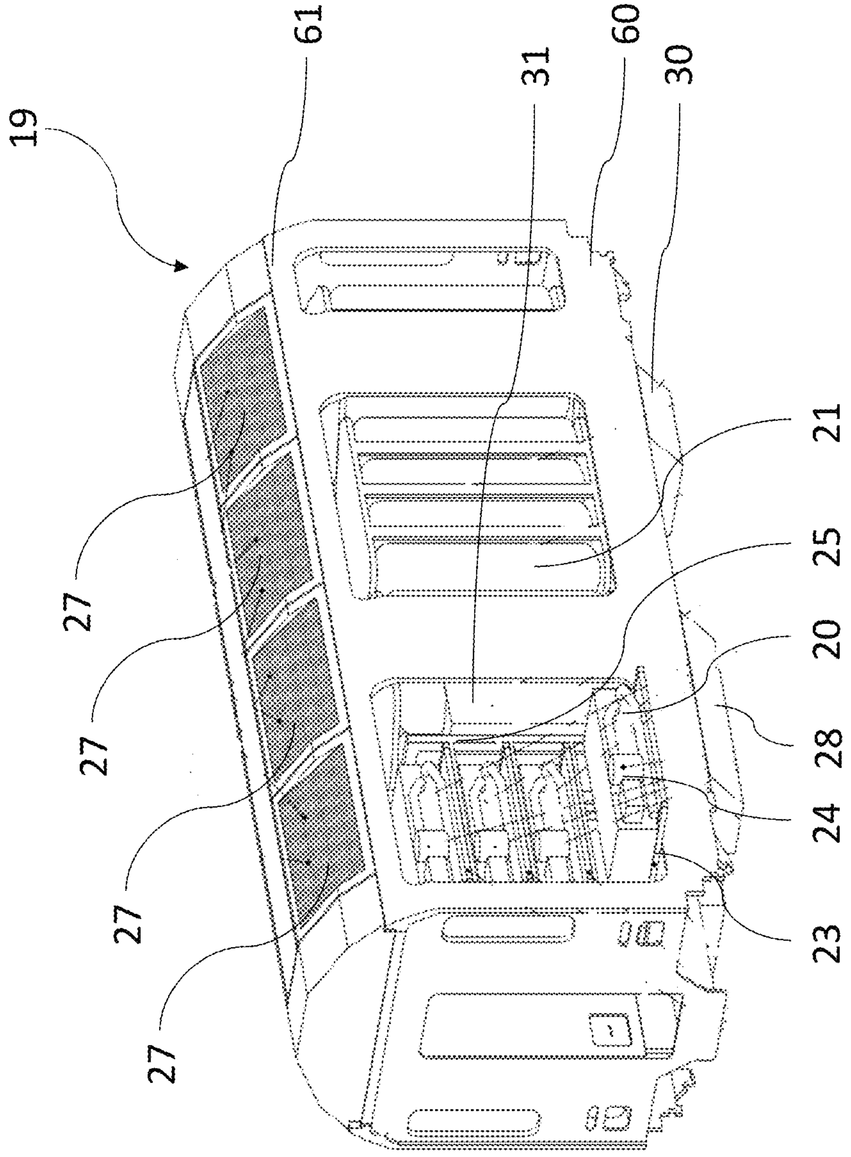
Figure 3:
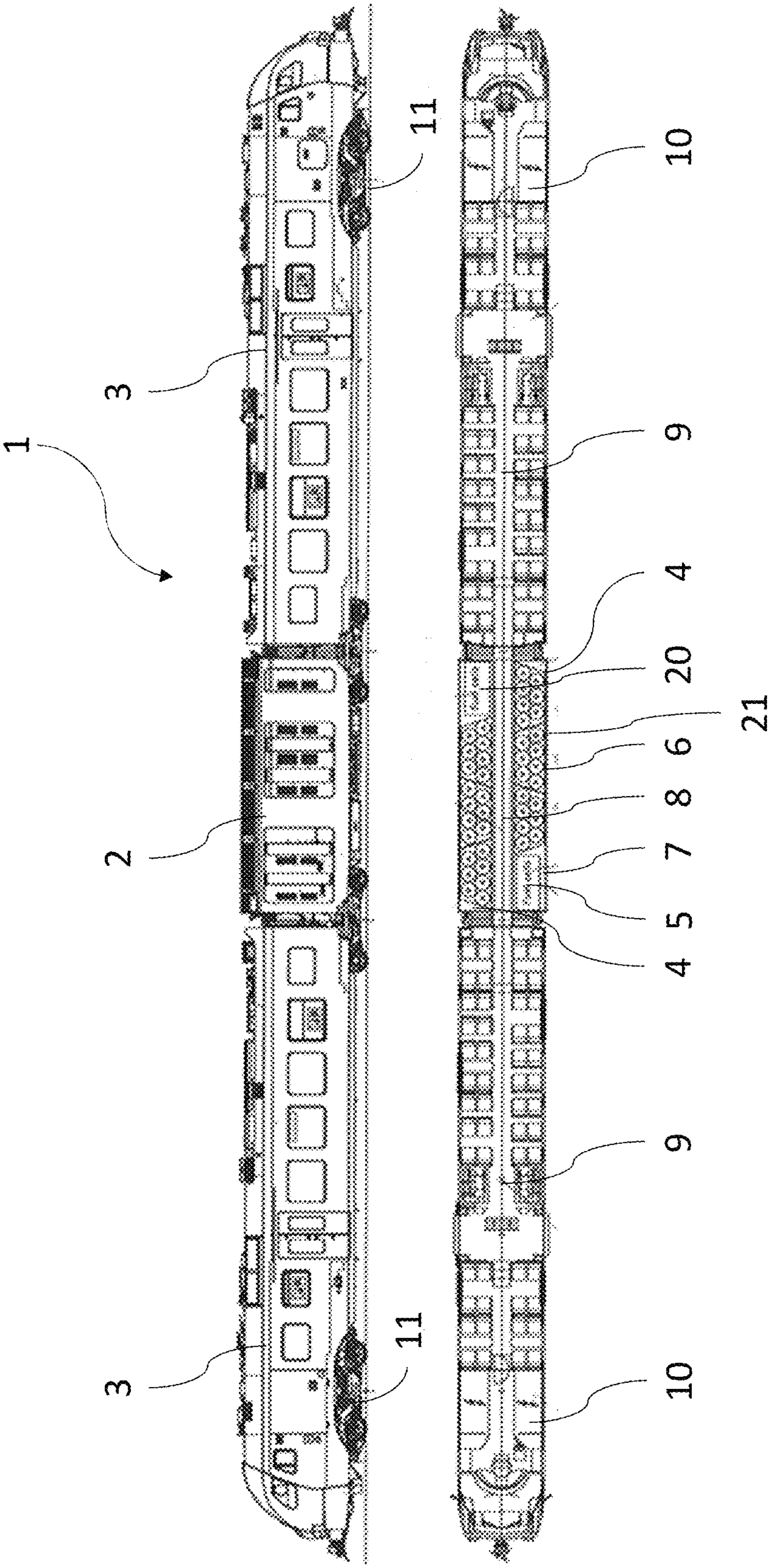
Figure 4:
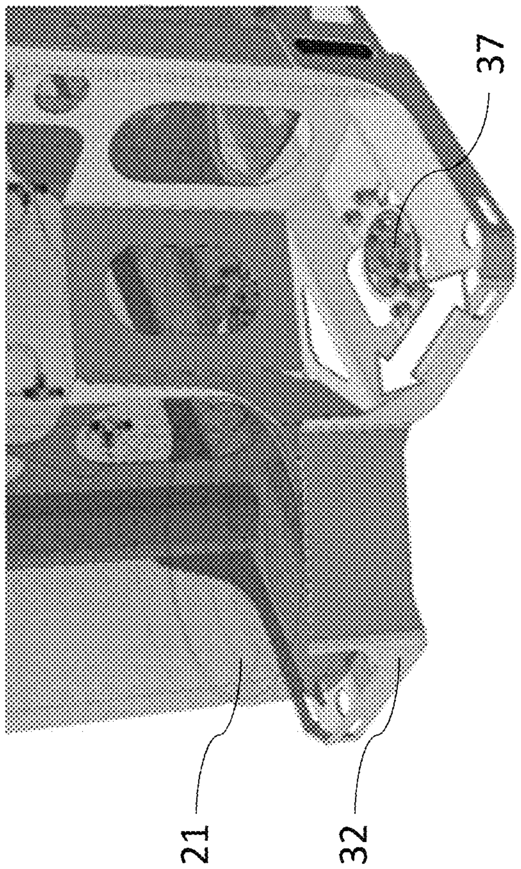
Figure 5:
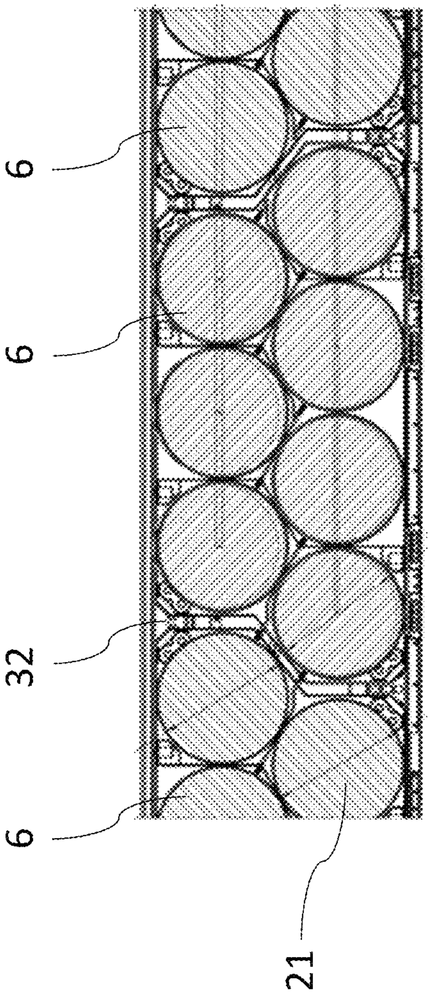
Figure 6:
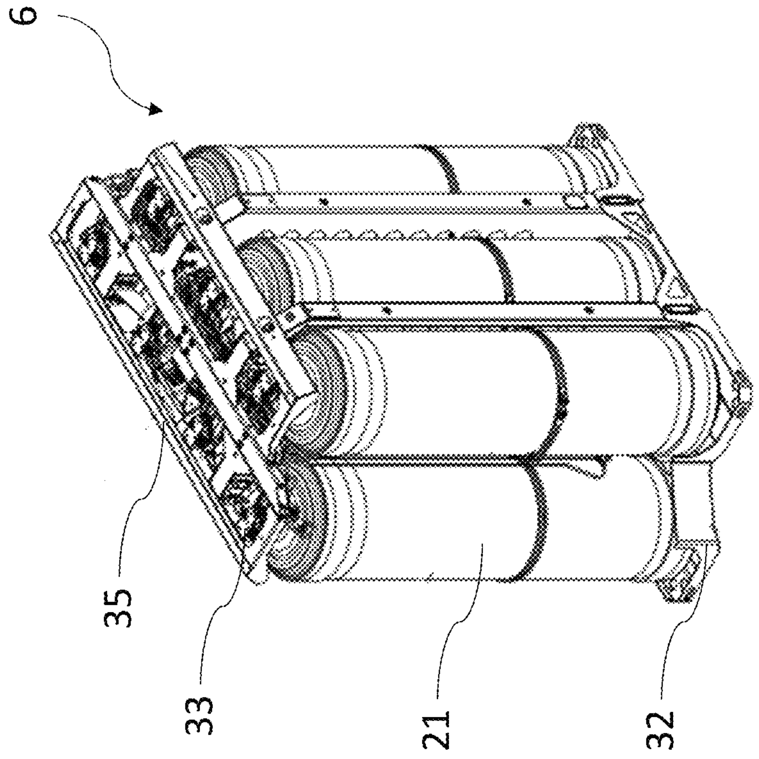
Figure 7:
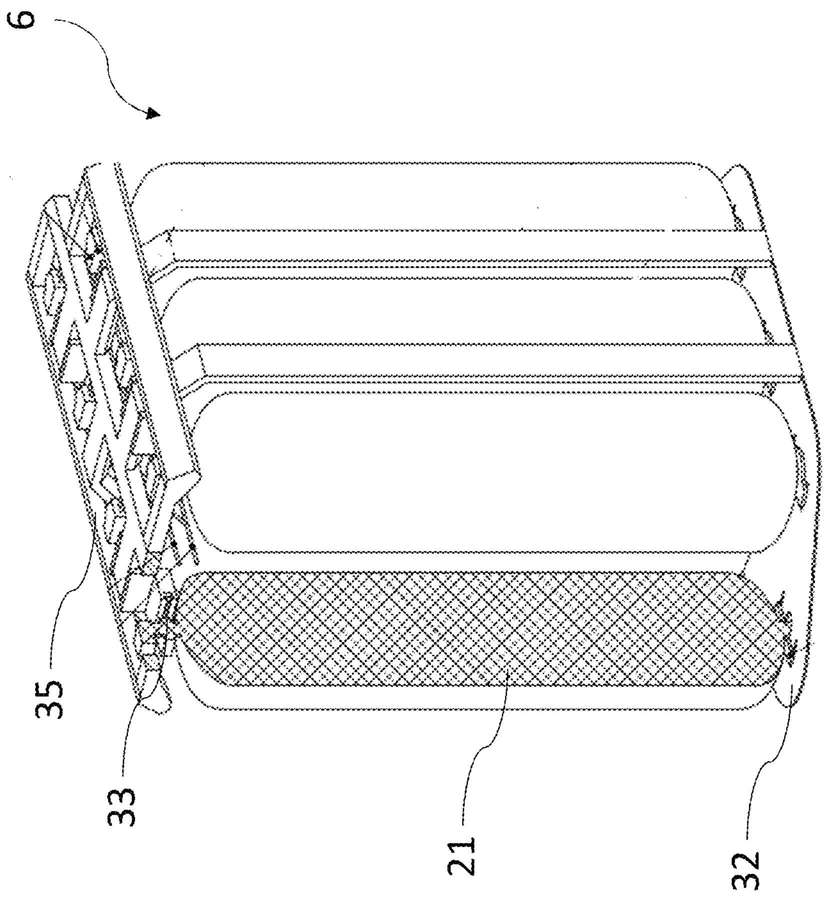
Figure 8:
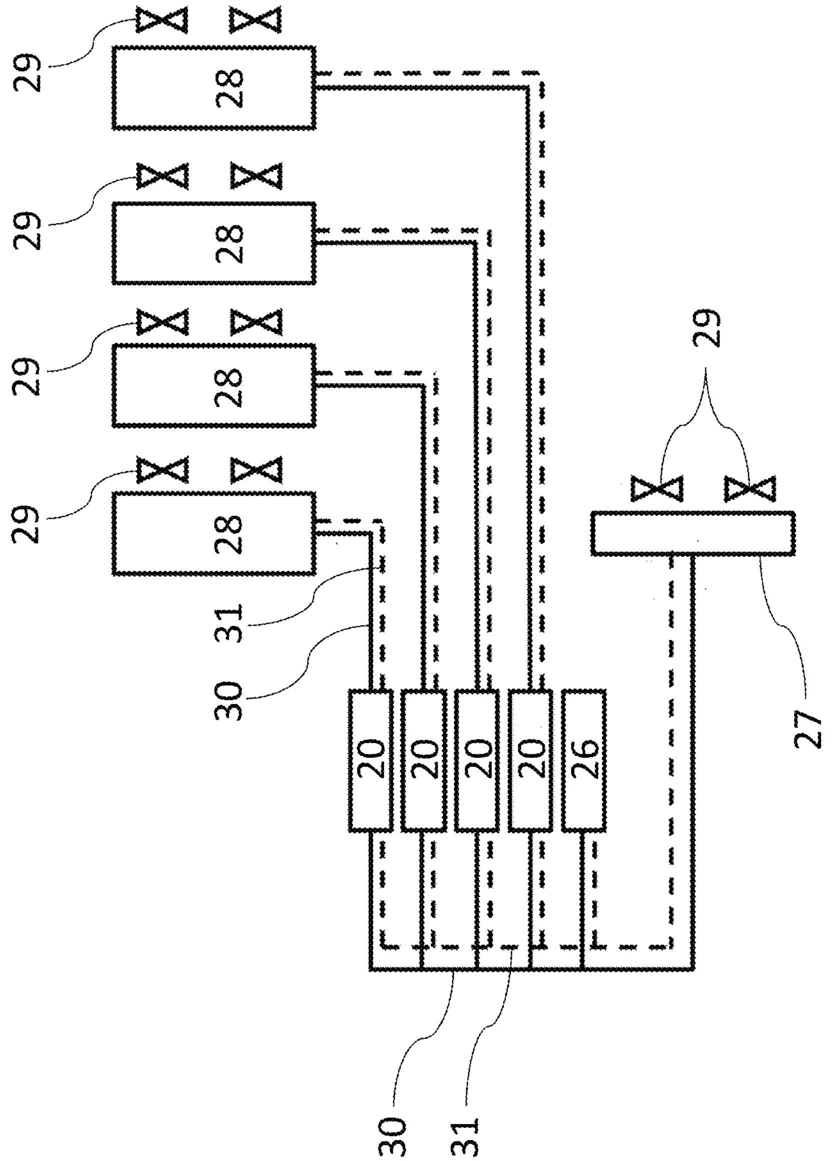

The invention is explained in more detail in the following figures. It shows:

FIG. 1: A view of a car body of a powerpack,

FIG. 2: a view of the car body of a powerpack with fuel cells and ventilation grids, FIG. 3: a rail vehicle with a powerpack and two end cars, FIG. 4: an arrangement of fuel tanks on a fuel tank frame, FIG. 5: a top view of an arrangement of fuel tanks, FIG. 6: a view of a storage module, FIG. 7: a view of a storage module with a section of a fuel tank, FIG. 8: a schematic view of a cooling system of the fuel cells.

FIG. 1 shows a view of a car body 19 of a powerpack (not shown). The car body 19 has a number of reinforcing elements 12. In addition, the car body 19 has passenger compartment walls 15. Maintenance hatches 17 are formed in the passenger compartment walls 15. Furthermore, the car body 19 has body pillars 13. The car body 19 has guides 18 for the storage modules (not shown).

The reinforcing elements 12 have a longitudinal axis which is substantially vertical. The body pillars 13 have a longitudinal axis which is substantially vertical. Thus, the reinforcing elements 12 and the carriage body pillars 13 are substantially vertically oriented. The service hatches 17 in the passenger compartment wall 15 allow access to the machine compartments 5 from the central aisle. The reinforcing elements 12 protect the interior of the powerpack 2 from external mechanical impacts. In the event of a crash, the reinforcing elements 12 partially distribute the occurring energy to several storage modules (not shown). In addition, the occurring energy is partially introduced into the car body 19 by the reinforcing elements 12. The reinforcing elements 12 can be made of S355 steel profiles. The beam sections may have the same depth as the vehicle body structure. In the lower part of the car body 19, the reinforcing elements 12 have their lower end firmly connected to the lower part 60 of the car body 19. The reinforcing elements 12 are supported in the upper part 61 of the car body 19 with their upper end by a floating bearing. Floating bearing means that the reinforcing elements 12 are supported by the floating bearing in a displaceable manner in the direction of travel of the powerpack 2 and are supported in a non-displaceable manner in a direction transverse to the direction of travel of the powerpack 2. The reinforcing elements 12 can be at a maximum distance of 1 m apart.

FIG. 2 shows a view of a car body 19 of a power pack (not shown) with fuel cells 20 and air inlets 27. Air inlets 27 are formed on the roof of the car body. A fan and heat exchanger 30 for LT cooling is also formed on the underbody of the car body 19. The car body 19 has extendable platforms 23. The extendable platforms 23 are slidably arranged in the mounting devices 25. A transducer 28 is also formed on the underbody of the car body 19. The powerpack 2 has a pressure control unit 31. The reinforcing elements 12 protect the interior of the powerpack 2 from external mechanical impact. In the event of a crash, the reinforcing elements 12 distribute some of the energy to several storage modules (not shown). In addition, the occurring energy is partially transmitted through the reinforcing elements 12 into the car body 19. The reinforcing elements 12 can be made of S355 steel profiles. The beam sections can have the same depth as the car body structure. In the lower part of the car body 19, the reinforcing elements 12 have their lower end firmly connected to the lower part 60 of the car body 19. The reinforcing elements 12 are supported in the upper part 61 of the car body 19 with their upper end by a floating bearing. The car body 19 has fuel tanks 21. The fuel tanks 21 have longitudinal axes which are oriented substantially vertically. The fuel cells 20 are arranged on extendable platforms 23 of the powerpack 2. The extendable platforms 23 are arranged in a mounting device 25. Thus, the fuel cells 20 are extendable from the car body 19 on the extendable platforms 23, which are arranged on the holding device 25. On the extendable platform 23, auxiliary operations 24 for the fuel cells 20 are arranged for each fuel cell 20.

In the extended state of the platforms 23, the fuel cell 20 can advantageously be serviced or replaced. There are four fuel cells 20 arranged one above the other on extendable platforms 23 of the powerpack (not shown). Auxiliary equipment 24 is arranged between the fuel cells 20 and the outer wall of the car body 19.

FIG. 3 shows a rail vehicle 1 with a powerpack 2 and two end cars 3. The end cars 3 each have a motor bogie 11 which is driven. The motor bogies 11 are conventional bogies. The powerpack 2 is connected to each of the end cars 3 by a Jakobs bogie. The powerpack 2 is located between the two end cars 3. The end cars 3 each have power converters 10 for traction. Furthermore, the end cars 3 each have a passenger compartment with provisions for passengers to stay, for example seats. The powerpack 2 does not have a space for the permanent residence of passengers. However, the powerpack 2 has a central aisle 8. On each side of the central aisle 8 of the powerpack 2, there are respectively a tank compartment 4 for the fuel tanks 21 and a machine compartment 5 for the fuel cells 20. Thus, the tank compartments 4 for the fuel tanks 21 and the machine compartments 5 for the fuel cells 20 are arranged essentially point-symmetrically. Each tank compartment 4 for the fuel tanks 21 has three storage modules 6. A storage module 6 comprises seven fuel tanks 21.

FIG. 4 shows an arrangement of fuel tanks 21 on a fuel tank frame 32. The fuel tank frame 32 has an overload mechanism 37. The fuel tanks 21 are spaced apart from each other so that they can expand when heated or refuelled. The longitudinal axis of the fuel tanks 21 is substantially vertical. Thus, the longitudinal axes of the fuel tanks 21 are arranged substantially parallel. The fuel tanks 21 are slidably formed in the fuel tank frame 32 in the event of an overload. An overload refers to mechanical loads that are significantly higher than the usual mechanical loads during normal operation. In the event of a crash, at least part of the occurring energy is thus absorbed by displacement of the fuel tanks 21 or by deformation of the fuel tank framework 32. As a result of the displaceability of the fuel tanks 21 and the displaceability of the fuel tank frame 32, the fuel tanks 21 only have to absorb a fraction of the energy that they would have to absorb without displaceability. Thus, the forces exerted on the fuel tanks' 21 in the event of a crash are minimized. This ensures that the fuel tanks 21 only have to absorb a minimum of crash energy. It is therefore extremely unlikely that the fuel tanks 21 will be deformed or burst by external mechanical action.

FIG. 5 shows a top view of an arrangement of fuel tanks 21. The fuel tanks 21 are arranged in a fuel tank frame 32. The longitudinal axis of the fuel tanks 21 is substantially vertical. The storage module 6 has seven fuel tanks 21. The storage module 6 is shown complete with seven fuel tanks 21. To the right and left of the completely shown storage module 6, respectively, further storage modules 6 are arranged, which, however, are only partially shown. By arranging fuel tanks 21 in a storage module 6, it is possible to equip the rail vehicle (not shown) with storage modules 6 as required. By combining fuel tanks 21 into a storage module 6, several fuel tanks 21 can be installed or removed simultaneously. This makes installation or removal simple and efficient. The storage module 6 has an odd number of fuel tanks 21. This allows the essentially cylindrical fuel tanks 21 of the storage module 6 to be arranged alternately, thus saving space.

FIG. 6 shows a view of a storage module 6. Seven fuel tanks 21 are formed in the storage module 6. The seven fuel tanks 21 are arranged on a fuel tank frame 32. The fuel tanks 21 each have fuel tank valves 33 arranged on the top of the fuel tanks 21. The fuel tank valves 33 are each protected by safety devices 35. The longitudinal axis of the fuel tanks 21 is substantially vertical. The longitudinal axes of the fuel tanks 21 are oriented substantially parallel. The storage module 6 has an odd number of fuel tanks 21. This allows the substantially cylindrical fuel tanks 21 of the storage module 6 to be arranged alternately, thus saving space.

It is possible to vary the available space for fuel tanks 21 as required. Preferably, the length of the powerpack 2 can be varied in steps corresponding to the length of a storage module 6. Thus, it may be possible to add only complete memory modules 6 to a powerpack 2 at a time. There can thus be powerpack lengths for, for example, one, two, three, four, five, six, seven or eight or more storage modules 6. The power pack lengths can thus be adapted to a whole number of storage modules 6.

FIG. 7 shows a view of a storage module 6 with a section of a fuel tank 21. Seven fuel tanks 21 are formed in the storage module 6. The seven fuel tanks 21 are arranged on a fuel tank frame 32. The fuel tanks 21 each have fuel tank valves 33 arranged on the top of the fuel tanks 21. The fuel tank valves 33 are each protected by safety devices 35. The longitudinal axis of the fuel tanks 21 is substantially vertical. The longitudinal axes of the fuel tanks 21 are substantially parallel. The storage module 6 has an odd number of fuel tanks 21. The substantially cylindrical fuel tanks 21 of the storage module 6 are arranged in an alternating and thus space-saving manner.

Such an arrangement of fuel tanks 21 in a storage module 6 makes it possible to vary the available space for fuel tanks 21 as required. The length of the powerpack 2 can be varied in steps corresponding to the length of a storage module 6. Thus, it may be possible to add only complete storage modules 6 to a powerpack 2 at a time. There may thus be powerpack lengths for, for example, one, two, three, four, five, six, seven or eight or more storage modules 6. The power pack lengths can thus be adapted to a whole number of storage modules 6.

FIG. 8 shows a schematic diagram of a cooling system of the fuel cells 20. An LT cooling circuit 27 is associated with four fuel cells 20. The LT cooling circuit 27 is connected to each of the fuel cells 20 via a forward flow 30 and a return flow 31. The LT cooling circuit 27 also cools a DC/DC-converter 26. The LT cooling circuit 27 is also connected to the DC/DC-converter 26 by a forward flow 30 and a return flow 31. The LT cooling circuit 27 is cooled by means of two fans 29. An HT cooling circuit 28 is associated with each fuel cell 20. Four HT cooling circuits 28 are thus assigned to the four fuel cells 20. A fuel cell 20 and an HT cooling circuit 28 are each connected by means of a forward flow 30 and a return flow 31. Two fans 29 are assigned to each HT cooling circuit 28. The fans 29 remove heat from the HT cooling circuits. A total of ten fans 29 are assigned to the four HT cooling circuits 28 and the LT cooling circuit 27.

The invention claimed is:

1. A rail vehicle comprising a first passenger car and a powerpack having a longitudinal axis, the powerpack and the passenger car being coupled together, the powerpack comprising at least one fuel cell and at least one fuel tank having a fuel tank valve, the powerpack being mounted on at least one bogie and the rail vehicle comprising at least one driven bogie which is configured to be supplied with electrical energy from the at least one fuel cell wherein the powerpack has an aisle which is accessible to passengers and wherein the aisle is a central aisle and wherein a machine compartment and a tank compartment are arranged on each side of the aisle and thus one power supply system is formed on each rail vehicle side.

2. The rail vehicle according to claim 1, wherein the powerpack has at least one machine compartment for the at least one fuel cell and at least one tank compartment for the at least one fuel tank.

3. The rail vehicle according to claim 2, wherein reinforcing elements are arranged on an outer side of the at least one machine compartment and/or the at least one tank compartment and connect an upper part of the car body and a lower part of the car body.

4. The rail vehicle according to claim 2, wherein the at least one tank compartment has ventilation openings.

5. The rail vehicle according to claim 1, wherein the powerpack comprises a first power supply system comprising at least one fuel cell and one fuel tank and a second power supply system comprising at least one fuel cell and one fuel tank.

6. The rail vehicle according to claim 5, wherein the rail vehicle has a refuelling device which is connected to the at least one fuel tank and has a right refuelling nozzle which is accessible from the right side of the longitudinal axis of the powerpack and has a left refuelling nozzle which is accessible from the left side of the longitudinal axis of the powerpack.

7. The rail vehicle according to claim 6, wherein one refuelling device is formed for each of the first and second power supply systems.

8. The rail vehicle according to claim 5, wherein the first power supply system comprises a first controller and the second power supply system comprises a second controller.

9. The rail vehicle according to claim 5, wherein the powerpack comprises acceleration sensors and a valve control system, the valve control system being configured such that all fuel tank valves of the first power supply system and the second power supply system can be closed if a permissible acceleration is exceeded.

10. The rail vehicle according to claim 5, wherein the power pack comprises acceleration sensors and a valve control system for each power supply system.

11. The rail vehicle according to claim 1, wherein the at least one fuel tank, is designed to be displaceable in the event of an overload.

12. The rail vehicle according to claim 1, wherein at least two fuel tanks are mounted on a storage module, the storage module enabling simultaneous installation and removal, and the storage module being mounted in the powerpack such that it can be displaced.

13. The rail vehicle according to claim 12, wherein the storage module can be displaced for installation and removal and wherein the storage module can be fastened detachably in an installation position in the powerpack.

14. The rail vehicle according to claim 1, wherein the rail vehicle comprises a second passenger car that is coupled to the powerpack.

15. The rail vehicle according to claim 14, wherein the first and the second passenger car are each connected to the powerpack via Jacob's bogies.

16. The rail vehicle according to claim 1, wherein the at least one fuel cell is mounted on an extendable platform in a holding device.

17. The rail vehicle according to claim 16, wherein the holding device is mounted on dampers.

18. The rail vehicle according to claim 1, wherein each fuel tank is mounted by a fixed bearing and a floating bearing.

* * * * *